US012797805B2

(12) United States Patent
Katayama et al.

(10) Patent No.: US 12,797,805 B2
(45) Date of Patent: Nov. 17, 2026

(54) POROUS MEMBRANE LAMINATE

(71) Applicants: SUMITOMO ELECTRIC FINE POLYMER, INC., Osaka (JP); SUMITOMO ELECTRIC INDUSTRIES, LTD., Osaka (JP)

(72) Inventors: Hirokazu Katayama, Osaka (JP); Mitsuhiro Akama, Osaka (JP); Takamasa Hashimoto, Osaka (JP); Fumihiro Hayashi, Osaka (JP); Hiroyuki Tsujiwaki, Osaka (JP)

(73) Assignees: Sumitomo Electric Fine Polymer, Inc., Osaka (JP); Sumitomo Electric Industries, Ltd., Osaka (JP)

( * ) Notice: Subject to any disclaimer, the term of this patent is extended or adjusted under 35 U.S.C. 154(b) by 295 days.

(21) Appl. No.: 18/835,793

(22) PCT Filed: Nov. 15, 2022

(86) PCT No.: PCT/JP2022/042432

§ 371 (c)(1),
(2) Date: Aug. 5, 2024

(87) PCT Pub. No.: WO2023/162368

PCT Pub. Date: Aug. 31, 2023

(65) Prior Publication Data

US 2025/0135406 A1 May 1, 2025

(30) Foreign Application Priority Data

Feb. 28, 2022 (JP) ................................ 2022-030171

(51) Int. Cl.
*B01D 69/02* (2006.01)
*B01D 61/14* (2006.01)
(Continued)

(52) U.S. Cl.
CPC ........... *B01D 69/02* (2013.01); *B01D 69/107* (2022.08); *B01D 69/1213* (2022.08);
(Continued)

(58) Field of Classification Search
CPC .. B01D 69/02; B01D 69/107; B01D 69/1213; B01D 71/36; B01D 61/147;
(Continued)

(56) References Cited

U.S. PATENT DOCUMENTS

2003/0089660 A1* 5/2003 Huang ............... B01D 67/0083 210/500.36
2012/0048800 A1* 3/2012 Farzana ............. B01D 69/1216 156/308.2
(Continued)

FOREIGN PATENT DOCUMENTS

JP 2003-138047 A 5/2003
JP 2010-094579 A 4/2010
(Continued)

OTHER PUBLICATIONS

Hernandez et. al. "Pore size distributions in microporous membranes. A critical analysis of the bubble point extended method". Journal of Membrane Science 112: 1-12 (Year: 1996).*

*Primary Examiner* — Liam Royce
(74) *Attorney, Agent, or Firm* — Renner, Otto, Boisselle & Sklar, LLP

(57) ABSTRACT

A porous membrane laminate according to one aspect of the present disclosure has one or more porous membranes containing polytetrafluoroethylene as a main component, wherein the porous membrane laminate satisfies a following formula (1):

$$P/\gamma > -31.6 \times \ln Ra + 168 \quad (1)$$

(Continued)

wherein P is an average bubble point [kPa]; $\gamma$ is a surface tension [dyn/cm] of a test liquid used in measurement of the average bubble point; and Ra is a surface roughness [nm] of the porous membrane, and 14 nm≤Ra≤96 nm.

4 Claims, 2 Drawing Sheets

(51) Int. Cl.

| | |
|---|---|
| ***B01D 69/10*** | (2006.01) |
| ***B01D 69/12*** | (2006.01) |
| ***B01D 71/36*** | (2006.01) |
| ***B32B 27/30*** | (2006.01) |
| ***B32B 27/32*** | (2006.01) |

(52) U.S. Cl.
CPC ............ *B01D 71/36* (2013.01); *B01D 61/147* (2013.01); *B01D 2325/02* (2013.01); *B01D 2325/02833* (2022.08); *B01D 2325/06* (2013.01); *B32B 27/30* (2013.01); *B32B 27/322* (2013.01)

(58) Field of Classification Search
CPC ...... B01D 2325/02; B01D 2325/02833; B01D 2325/06; B32B 27/30; B32B 27/322
See application file for complete search history.

(56) References Cited

U.S. PATENT DOCUMENTS

| | | | | |
|---|---|---|---|---|
| 2020/0197877 | A1 | 6/2020 | Hying et al. | |
| 2021/0134534 | A1 * | 5/2021 | Toshinari | H01G 11/80 |

FOREIGN PATENT DOCUMENTS

| | | | |
|---|---|---|---|
| JP | 2017-519619 | A | 7/2017 |
| JP | 2019-192749 | A | 10/2019 |
| JP | 2020-111042 | A | 7/2020 |
| WO | 2015/157119 | A1 | 10/2015 |
| WO | 2017/170288 | A1 | 10/2017 |

* cited by examiner

POROUS MEMBRANE LAMINATE

TECHNICAL FIELD

The present disclosure relates to a porous membrane laminate. The present application claims priority from Japanese application, Japanese Patent Application No. 2022-030171, filed on Feb. 28, 2022. The entire description contents of the Japanese application are hereby incorporated by reference.

BACKGROUND ART

Porous membranes using polytetrafluoroethylene have characteristics of polytetrafluoroethylene, such as high heat resistance, chemical stability, weatherability, nonflammability, high strength, non-stickiness and low friction coefficient, and characteristics due to porousness, such as flexibility, dispersion medium permeability, particle capturing performance and low dielectric constant. Hence, porous membranes having polytetrafluoroethylene as a main component are often used as microfiltration filters for dispersion medium and gases in the semiconductor-related field, the liquid crystal-related field and food and medical treatment fields. In conventional technologies, as a filtration filter, there has recently been proposed a porous membrane laminate using a porous membrane, having PTFE as a main component, capable of capturing microparticles of less than 0.1 μm in particle diameter (see Japanese Patent Laying-Open No. 2010-94579).

CITATION LIST

Patent Literature

PTL 1: Japanese Patent Laying-Open No. 2010-94579

SUMMARY OF INVENTION

A porous membrane laminate according to one aspect of the present disclosure comprises one or more porous membranes containing polytetrafluoroethylene as a main component, and satisfies a following formula (1):

$$P/\gamma > 31.6 \times \ln Ra + 168 \quad (1)$$

wherein P is an average bubble point [kPa]; γ is a surface tension [dyn/cm] of a test liquid used in measurement of the average bubble point; and Ra is a surface roughness [nm] of the porous membrane, and 14 nm≤Ra≤96 nm.

DETAILED DESCRIPTION

Figure 1:
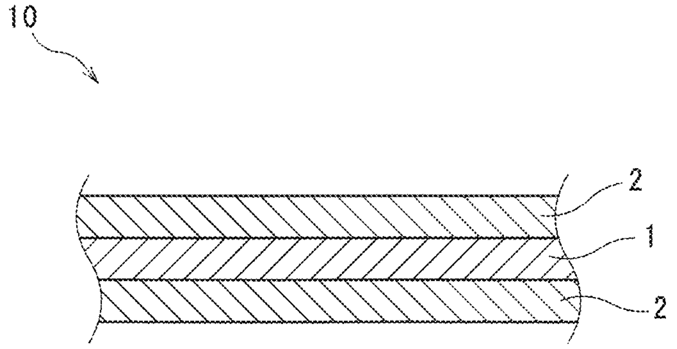
FIG. 1 is a schematic partial cross-sectional view showing a porous membrane laminate according to one embodiment of the present disclosure.

Problem to be Solved by the Present Disclosure

In the above-mentioned fields, due to further technological innovation and rising requirements, higher performance microfiltration filters are demanded. Specifically, in the semiconductor field and the liquid crystal field, the integration level has been raised and photoresists have been micronized to the region of 0.5 μm or less. Hence, microfiltration filters capable of securely capturing such microparticles are needed. These microfiltration filters are used mainly as filters for treating outside air of cleanrooms, filtration filters for chemical liquids, and the like, and their performance affects also the yield of products. Further, in the food and medical treatment fields, due to recent year's growing safety consciousness, the removability of micro foreign matter is strongly demanded.

The present disclosure has been achieved based on such a situation, and has an object to provide a porous membrane laminate excellent in the capturing performance of microparticles.

Advantageous Effect of the Present Disclosure

According to the present disclosure, there can be provided a porous membrane laminate excellent in the capturing performance of microparticles.

Description of Embodiments

First, embodiments of the present disclosure will be listed and described.

[1] A porous membrane laminate according to one aspect of the present disclosure comprises one or more porous membranes containing polytetrafluoroethylene as a main component, and satisfies a following formula (1):

$$P/\gamma > -31.6 \times \ln Ra + 168 \quad (1)$$

wherein P is an average bubble point [kPa]; γ is a surface tension [dyn/cm] of a test liquid used in measurement of the average bubble point; and Ra is a surface roughness [nm] of the porous membrane, and 14 nm≤Ra≤96 nm.

The above average bubble point P is related to the size of pores (throats) of the porous membrane inside, and a higher fiber density of the porous membrane inside gives a higher average bubble point P. On the other hand, the above surface roughness Ra indicates the size of pores of the porous membrane entrance, and a higher fiber density in the porous membrane surface gives a lower surface roughness Ra. When the surface roughness Ra is 14 nm or more and 96 nm or less, the capturing performance of microparticles can be good. In the case where P/γ is lower than −31.6×ln Ra+168, it is indicated that the fiber density of the porous membrane is lower in the porous membrane entrance (porous membrane surface) than in the porous membrane inside, and since the opportunity for particles flowing in the thickness direction to collide with fibers is less, the capturing performance becomes low. Further, since the capturing of microparticles concentrates and proceeds in throat portions of the porous membrane inside, and clogging of pores thereby occurs earlier, the life of the porous membrane becomes short. Therefore, in the case where the porous membrane laminate satisfies the above formula (1), that is, when P/γ is higher than −31.6×ln Ra+168, it is indicated that the fiber density is high from the porous membrane entrance (porous membrane surface) to the porous membrane inside, and since the opportunity for particles flowing in the thickness direction to collide with fibers is increased, the capturing performance becomes high. Further since particles are captured in the broad range from the surface to the inside, and the clogging thereby hardly occurs, the effect of elongating the life of the porous membrane can be anticipated.

The "main component" refers to a component whose content is highest in terms of mass, and refers to, for example, a component whose content is 90% by mass or more, preferably 95% by mass or more. The "average bubble point P" indicates an average flow pore size pressure. The average flow pore size pressure is such that: relations between the differential pressure applied on a porous membrane and the air flow passing through the porous membrane are measured for the case where the porous membrane is dry and for the case where the porous membrane is wet with a test liquid (reagent) by the bubble point method (ASTM F316-86, JIS K3832) using a pore size distribution analyzer or the like; obtained graphs are taken as a dry curve and a wet curve, respectively; and the differential pressure at the intersection between a curve obtained by reducing the flow of the dry curve into ½ thereof and the wet curve is taken as an average flow pore size pressure P (Pa). The "average bubble point P" uses, as the test liquid, propylene, 1,1,2,3,3,3-oxidized hexahydrofluoric acid having a surface tension of 15.9 mN/m, and is measured by using a pore diameter distribution analyzer (for example, Perm Porometer "CFP-1500A", manufactured by Porous Materials, Inc.). The "surface roughness Ra" can be determined by using a scanning probe microscope ("SPM-9700HT", manufactured by Shimadzu Corp.) and observing the shape and the phase and thereafter analyzing the roughness of an observed image. The condition of the cantilever is set at a spring constant of 2 N/m, a resonance frequency of 70 kHz, and a radius of the tip curvature of 7 nm or less. The scanning region is set at 10 μm×10 μm, and the number of pixels is set at 256×256. The porous membrane is cut out after support membranes are peeled off; and the measurement is carried out at any two positions of the outer side (surface) of the porous membrane and the average thereof is taken as the surface roughness Ra. Then, in the case where in a porous membrane laminate, there are a plurality of porous membranes, in the porous membrane laminate having a first principal surface and a second principal surface, there are determined an average value of surface roughnesses of any two positions of the surface on the first principal surface side of a porous membrane positioned nearest the first principal surface side and an average value of surface roughnesses of any two positions of the surface on the second principal surface side of a porous membrane positioned nearest the second principal surface side, and the surface roughness Ra is determined by dividing the sum of these average values by 2.

[2] It is preferable that in the above [1], the porous membrane laminate satisfies a following formula (2):

$$K < 31.6 \times \ln Ra - 58 \quad (2)$$

wherein K is an average flow pore size [nm]; and Ra is as defined for the formula (1).

The average flow pore size K refers to a size (cramped pore diametric dimension) of throat portions narrowest in the thickness direction. The average flow pore size K being 31.6×ln Ra—58 or more means that the pore size is large in the thickness range of from throat portions toward the surface, and since the opportunity for particles flowing in the thickness direction to collide with pores is poor, the capturing performance becomes low. On the other hand, the average flow pore size K being less than 31.6×ln Ra—58 means that the pore size is small at least in the cross-section range including from the surface side to throat portions, and since the opportunity for particles flowing in the thickness direction to collide with pores is increased, the capturing performance becomes high.

The "average flow pore size" can be measured by the bubble point method using a pore size distribution analyzer according to ASTM F316-03, JIS-K3832 (1990). Specifically, relations between the differential pressure applied on a porous membrane and the air flow passing through the porous membrane are measured for the case where the porous membrane is dry and for the case where the porous membrane is wet with a test liquid; obtained graphs are taken as a dry curve and a wet curve, respectively; and when the differential pressure at the intersection between a curve obtained by reducing the flow of the dry curve into ½ thereof and the wet curve is taken as P(Pa), the average flow pore size is a value of d (nm) represented by the expression d=cγ/P. Here, the c is a constant and 2,860; and the γ is a surface tension (dyn/cm-mN/m) of the test liquid. Examples of the test liquid include propylene, 1,1,2,3,3,3-oxidized hexahydrofluoric acid (γ: 15.9 dyn/cm), isopropyl alcohol (γ: 20.8 mN/m) and a hydrofluoroether (γ: 15.9 dyn/cm). Examples of the pore diameter distribution analyzer includes Perm Porometer "CFP-1500A", manufactured by Porous Materials, Inc., and the average flow pore size can be calculated from a pore size distribution measured by the pore diameter distribution analyzer.

[3] In the above [2], in the porous membrane laminate, it is preferable that the average flow pore size K is 58 nm or less, and it is preferable that the surface roughness Ra is 55 nm or less. When the average flow pore size K indicating pore sizes of the porous membrane laminate inside is 58 nm or less, the capturing performance of microparticles in the porous membrane laminate can be improved. Further, when the surface roughness Ra of the porous membrane laminate is 55 nm or less, the fiber length of the porous membrane laminate becomes short and the fiber density of the porous membrane laminate becomes high, so that the distance between fibers forming pores of the surface of the porous membrane laminate is short. In the porous membrane laminate, by specifying both of the pore size of the porous membrane laminate inside and the pore size of the porous membrane laminate surface below the predetermined range, the capturing performance of microparticles can more be improved.

[4] In any one of the above [1] to [3], it is preferable that the porous membrane laminate further comprises one or more porous support membranes containing polytetrafluoroethylene as a main component, and the support membrane is laminated on one or both surfaces of the porous membrane. When the porous membrane laminate has one or more porous support membranes and the support membrane is laminated on one or both surfaces of the porous membrane, in the interface between the support membrane and the porous membrane, paths of throughpores in the membrane thickness direction become complex and it becomes easy for particles to be captured, so that the porous membrane laminate can be improved in the capturing performance and can simultaneously be raised in the mechanical strength and the life thereof. Further, when the support membrane contains polytetrafluoroethylene as a main component, the heat resistance, the chemical stability and the like can be improved.

DETAILS OF EMBODIMENTS OF THE PRESENT DISCLOSURE

Hereinafter, preferred embodiments of the present disclosure will be described by reference to the drawings.

<Porous Membrane Laminate>

The porous membrane laminate has one or more porous membranes containing polytetrafluoroethylene as a main component. Then, it is preferable that the porous membrane laminate further has one or more porous support membranes containing polytetrafluoroethylene as a main component, and the support membrane is laminated on one or both surfaces of the porous membrane. That is, the porous membrane laminate can be made by freely combining and laminating one or more porous membranes and one or more support membranes. When the porous membrane laminate has one or more porous support membranes and the support membrane is laminated on one or both surfaces of any one porous membrane among the one or more porous membranes, the support membrane functions as a protective material of the porous membrane, so that the porous membrane laminate can be improved in the capturing performance and can simultaneously be raised in the mechanical strength and the life thereof.

FIG. 1 is a schematic partial cross-sectional view showing a porous membrane laminate according to one embodiment of the present disclosure. The porous membrane laminate 10 shown in FIG. 1 has a porous membrane 1, and a porous support membrane 2 laminated on either surface of porous membrane 1. Porous membrane laminate 10 has porous support membrane 2 laminated on either surface of porous membrane 1.

Porous membrane laminate 10 has one or more porous membranes containing polytetrafluoroethylene as a main component, and satisfies the following formula (1):

$$P/\gamma > -31.6 \times \ln Ra + 168 \tag{1}$$

wherein P is an average bubble point [kPa]; $\gamma$ is a surface tension [dyn/cm] of a test liquid used in measurement of the average bubble point; and Ra is a surface roughness [nm] of the porous membrane, and 14 nm≤Ra≤96 nm.

The porous membrane laminate 10, due to satisfying the above formula (1), is excellent in the capturing performance of microparticles.

The lower limit of the average bubble point of porous membrane laminate 10 is preferably 500 kPa and more preferably 800 kPa. On the other hand, the upper limit of an isopropanol bubble point of porous membrane laminate 10 is not especially limited. In the case where the average bubble point of porous membrane laminate 10 is below 500 kPa, there is a risk that the liquid holding power of porous membrane laminate 10 becomes insufficient.

It is preferable that porous membrane laminate 10 satisfies the following formula (2):

$$K < 31.6 \times \ln Ra - 58 \tag{2}$$

wherein K is an average flow pore size [nm]; and Ra is as defined for the formula (1).

Porous membrane laminate 10, due to satisfying the above formula (2), is excellent in the capturing performance of microparticles.

The upper limit of the average flow pore size K of porous membrane laminate 10 is preferably 87 nm, more preferably 58 nm, still more preferably 51 nm and especially preferably 40 nm. When the upper limit of the average flow pore size K of porous membrane laminate 10 is the above upper limit or less, the capturing performance of microparticles in porous membrane laminate 10 is excellent. On the other hand, the lower limit of the average flow pore size K of porous membrane laminate 10 is preferably 15 nm and more preferably 20 nm. In the case where the average flow pore size K of porous membrane laminate 10 is less than the above lower limit, there is a risk that the pressure loss of porous membrane laminate 10 is increased.

[Porous Membrane]

Porous membrane 1 is constituted of a biaxially stretched porous membrane containing polytetrafluoroethylene as a main component. The biaxially stretched porous membrane is made by stretching a sheet containing PTFE as a main component in two directions on the surface that are orthogonal to each other to make the sheet porous. Porous membrane 1 prevents permeation of minute impurities and simultaneously causes a filtrate to permeate in the thickness direction. The polytetrafluoroethylene also includes modified polytetrafluoroethylene. The “modified polytetrafluoroethylene” refers to polytetrafluoroethylene copolymerized with a small amount, preferably 1/50 or less (in molar ratio) to tetrafluoroethylene, of hexafluoropropylene (HFP), alkyl vinyl ether (AVE), chlorotrifluoroethylene (CTFE) or the like.

The PTFE is preferably a high-molecular weight one. By using a high-molecular weight PTFE powder, the growth of the fibrous framework can be promoted while excessive expansion of pores and cleavage of the porous membrane during stretching are prevented. Then, a porous membrane can be formed in which knots in the porous membrane are reduced, and fine pores are densely formed.

The lower limit of the number-average molecular weight of the PTFE powder to form porous membrane 1 is preferably 12,000,000 and more preferably 20,000,000. On the other hand, the upper limit of the number-average molecular weight of the PTFE powder to form porous membrane 1 is preferably 50,000,000 and more preferably 40,000,000. In the case where the number-average molecular weight of the PTFE powder to form porous membrane 1 is less than the above lower limit, the pore size of porous membrane 1 becomes large, and there is a risk that the accuracy of the filtration treatment is decreased. On the other hand, in the case where the number-average molecular weight of the PTFE powder to form porous membrane 1 exceeds the above upper limit, there is a risk that the formation of porous membrane 1 becomes difficult. Then, the “number-average molecular weight” is that determined from the specific gravity of molded articles, but since the molecular weight of PTFE exhibits a large dispersion depending on measurement methods and exact measurement thereof is difficult, there are cases where the number-average molecular weight does not fall within the above range depending on measurement methods.

The lower limit of the average thickness of porous membrane 1 is preferably 1 μm and more preferably 5 μm. On the other hand, the upper limit of the average thickness of porous membrane 1 is preferably 50 μm and more preferably 40 μm. When the average thickness is below the above lower limit, there is a risk that the strength of porous membrane 1 becomes insufficient. On the other hand, when the average thickness exceeds the above upper limit, porous membrane 1 needlessly becomes thick, and there is a risk that the pressure loss when a filtrate permeates becomes large. When the average thickness of porous membrane 1 is in the above range, the strength and the filtration treatment efficiency of porous membrane 1 both can simultaneously be satisfied. The "average thickness" refers to an average value of thicknesses of any 10 points, and is determined by freeze-fracturing a sample central part in the MD direction to expose a cross-section, thereafter observing the cross-section by using a scanning electron microscope (SEM, "SU8020", manufactured by Hitachi High-Technologies Corp.), and measuring the membrane thicknesses of porous membrane 1.

The upper limit of the surface roughness Ra of porous membrane 1 is 96 nm and more preferably 55 nm. In the case where the surface roughness Ra of porous membrane 1 exceeds the above upper limit, since the denseness of fibers of the surface of porous membrane 1 becomes low and the pore size is large, there is a risk that the capturing performance of microparticles becomes insufficient. On the other hand, the lower limit of the surface roughness Ra of porous membrane 1 is 14 nm and preferably 17 nm.

The upper limit of the average fiber length of porous membrane 1 is preferably 2,300 nm and more preferably 1,800 nm. When the average fiber length exceeds 2,300 nm, the fiber density of porous membrane 1 becomes low, and there is a risk that the capturing performance of microparticles becomes insufficient. On the other hand, the lower limit of the average fiber length is preferably 100 nm and more preferably 150 nm. In the case where the average fiber length is less than 100 nm, there is a risk that the pressure loss is increased. The "average fiber length of the porous membrane" is a value obtained by dividing a SEM image of porous membrane 1 by a scanning electron microscope longitudinally into 10 equal regions, randomly selecting three fibers from each region and measuring fiber lengths thereof, and averaging all the measured fiber lengths.

The upper limit of the Gurlay's number of porous membrane 1 is preferably 100 s and more preferably 80 s. When the Gurlay's number exceeds the above upper limit, there is a risk that the filtration efficiency of porous membrane 1 is decreased. On the other hand, the lower limit of the Gurlay's number is preferably 1 s and more preferably 3 s. In the case where the Gurlay's number is less than the above lower limit, there is a risk that the pore size of porous membrane 1 becomes too large to reduce the capturing performance of microparticles. The "Gurlay's number" means a time taken for 100 $cm^3$ of air to pass through a sample of 6.42 $cm^2$ at an average pressure difference of 1.22 kPa, measured according to JIS-P8117 (2009).

The upper limit of the porosity of porous membrane 1 is preferably 90% and more preferably 85%. On the other hand, the lower limit of the porosity of porous membrane 1 is preferably 40% and more preferably 50%. In the case where the porosity of porous membrane 1 exceeds 90%, there is a risk that the capturing performance of microparticles in porous membrane 1 becomes insufficient. On the other hand, in the case where the porosity of porous membrane 1 is less than 40%, there is a risk that the pressure loss of porous membrane 1 is increased.

Porous membrane 1, in addition to PTFE, may contain other fluororesins and additives in the range of not impairing the desired advantageous effects of the present disclosure.

[Support Membrane]

Support membrane 2 is a porous body, and preferably contains polytetrafluoroethylene as a main component. When support membrane 2 contains polytetrafluoroethylene as a main component, the heat resistance, the chemical stability and the like can be improved.

The upper limit of the average thickness of support membrane 2 is preferably 20 μm and more preferably 15 μm. On the other hand, the lower limit of the average thickness of support membrane 2 is preferably 2 μm and more preferably 5 μm. In the case where the average thickness of support membrane 2 exceeds 20 μm, there is a risk that the pressure loss of porous membrane laminate 10 is increased. On the other hand, in the case where the average thickness of support membrane 2 is less than 2 μm, there is a risk that the strength of porous membrane laminate 10 becomes insufficient.

The lower limit of the average flow pore size of support membrane 2 is preferably 0.08 μm and more preferably 0.10 μm. On the other hand, the upper limit of the average flow pore size is preferably 3.00 μm and more preferably 1.50 μm. In the case where the average flow pore size of support membrane 2 is less than 0.08 μm, there is a risk that the pressure loss of porous membrane laminate 10 is increased. On the other hand, in the case where the average flow pore size of support membrane 2 exceeds 3.00 μm, there is a risk that the strength of support membrane 2 becomes insufficient.

[Method for Manufacturing the Porous Membrane Laminate]

There will be described one embodiment of a method for manufacturing the porous membrane laminate in the case of having, for example, porous membranes and support membranes. The method for manufacturing the porous membrane laminate comprises a step of molding sheets from kneaded materials, for example, of a PTFE powder and a liquid lubricant, a step of stretching the sheets being molded bodies, and a step of laminating porous membranes and support membranes obtained after the stretching step.

(Molding Step)

In the molding step, the kneaded materials of a PTFE powder manufactured by emulsion polymerization or the like and a liquid lubricant are extruded by a ram extruder to mold sheets. The raw material PTFE particles are a powder composed of microparticles of PTFE. Examples of the PTFE powder include PTFE fine powders manufactured by emulsion polymerization and PTFE molding powders manufactured by suspension polymerization, which are powders composed of PTFE microparticles.

As the liquid lubricant, various kinds of lubricants conventionally used in extrusion process can be used. Examples of the liquid lubricant include petroleum solvents such as solvent naphtha and white oil, hydrocarbon oils such as undecane, aromatic hydrocarbons such as toluol and xylol, alcohols, ketones, esters, silicone oils, fluorochlorocarbon oils, solutions in which a polymer such as polyisobutylene or polyisoprene is dissolved in these solvents, and water or aqueous solutions containing surfactants; and these can be used singly or as a mixture of two or more kinds. However, from the viewpoint of homogeneity of mixing, it is preferable to use a single-component liquid lubricant.

The lower limit of the mixing amount of the liquid lubricant with respect to 100 parts by mass of the PTFE powder is preferably 10 parts by mass and more preferably 16 parts by mass. On the other hand, the upper limit of the mixing amount of the liquid lubricant is preferably 40 parts by mass and more preferably 25 parts by mass. In the case where the mixing amount of the liquid lubricant is less than 10 parts by mass, there is a risk that the extrusion becomes difficult. Conversely, in the case where the mixing amount of the liquid lubricant exceeds 40 parts by mass, there is a risk that the compression molding described later becomes difficult.

The material for forming the porous membrane, according to purposes, in addition to the liquid lubricant, may contain other additives. Examples of the other additives include pigments for coloration, and inorganic fillers such as carbon black, graphite, silica powder, glass powder, glass fiber, silicate salts and carbonate salts, metal powders, metal oxide powders and metal sulfide powders for improving wear resistance, preventing low-temperature flowing, facilitating pore formation and the like. In order to aid the formation of the porous structure, substances which are to be removed or decomposed by heating, extraction, dissolution or the like, for example, ammonium chloride, sodium chloride, plastics other than PTFE, and rubbers, in a powdery state or solution state may be added.

In the present step, for example, first, the PTFE powder and the liquid lubricant are mixed, and thereafter compression molded into a block body being a primary molded body by a compression molding machine. Then, the block body is extruded into a sheet shape at room temperature (for example, 25° C.) or more and 50° C. or less, and at a ram speed of, for example, 10 mm/min or more and 30 mm/min or less. Further, the sheet body is rolled by a calender roll or the like to thereby obtain a PTFE sheet of 250 μm or more and 350 μm or less in average thickness.

The liquid lubricant contained in the PTFE sheet may be removed after stretching of the sheet, but is removed preferably before the stretching. The removal of the liquid lubricant can be carried out by heating, extraction, dissolution or the like. In the case of carrying out heating, by rolling the PTFE sheet by a hot roll of, for example, 130° C. or more and 220° C. or less, the liquid lubricant can be removed. In the case of using, as the liquid lubricant, a material having a relatively high boiling point, such as silicone oil or fluorochlorocarbon oil, the removal by extraction is suitable.

(Stretching Step)

In the present step, the PTFE sheet being a molded body is biaxially stretched. By the present step, pores are formed and the porous membrane can be obtained. In the present step, by stretching the PTFE sheet in the longitudinal direction (machine direction) and in the transverse direction (width direction) orthogonal to the longitudinal direction successively, a biaxially stretched porous membrane is obtained.

It is preferable that the stretching of the PTFE sheet is carried out at a high temperature, in order to make the porous structure dense. The lower limit of the temperature in the stretching is preferably 60° C. and more preferably 120° C. On the other hand, the upper limit of the temperature in the stretching is preferably 300° C. and more preferably 280° C. In the case where the temperature in the stretching is less than 60° C., there is a risk that the pore size becomes too large. Conversely, in the case where the temperature in the stretching exceeds 300° C., there is a risk that the pore size becomes too mall.

Further, it is preferable that the biaxially stretched porous membrane is, after the stretching, subjected to heat setting. By carrying out the heat setting, the shrinkage of the biaxially stretched porous membrane is prevented and the porous structure can more securely be retained. As a specific heat setting method, there can be used, for example, a method of fixing both ends of the biaxially stretched porous membrane, and holding the membrane at a temperature of 200° C. or more and 500° C. or less for 0.1 min or more and 20 min or less. Then, in the case of carrying out stretching in a multistage manner, it is preferable that the heat setting is carried out after every stage.

(Laminating Step)

In the present step, the porous membranes and the support membranes obtained in the above stretching step are laminated and heated to thereby form a porous membrane laminate. Specifically, one or more the support membranes are laminated on one surface or both surfaces of any of the one or more porous membranes.

Examples of a method of laminating the porous membrane on the support membrane include a method of fusion bonding by heating and a method of adhering by using an adhesive or a pressure-sensitive adhesive.

The method of fusion bonding by heating specifically involves first laminating the porous membrane, for example, on one surface of the support membrane, and heating the laminate to thermally fusion bond the layers at the boundary thereof to unify the layers to thereby obtain a porous membrane laminate. The lower limit of the heating temperature is preferably 327° C., which is the glass transition temperature of PTFE, and more preferably 360° C. On the other hand, the upper limit of the heating temperature is preferably 400° C. In the case where the heating temperature is less than 327° C., there is a risk that the thermal fusion bonding of the layers becomes insufficient. On the other hand, in the case where the heating temperature exceeds 400° C., there is a risk that each layer deforms. Then, it is preferable that the heating time is 0.5 min or more and 3 min or less.

The adhesive or the pressure-sensitive adhesive in the method of adhering by using an adhesive or a pressure-sensitive adhesive is, from the viewpoint of the heat resistance, the chemical resistance and the like, preferably a solvent-soluble or thermoplastic fluororesin or fluororubber.

(Hydrophilizing Treatment)

On the porous membrane laminate obtained as described above, a hydrophilizing treatment may bd carried out. The hydrophilizing treatment involves impregnating the porous membrane laminate with a hydrophilizing material and crosslinking the laminate. The hydrophilizing material includes polyvinyl alcohols (PVA), ethylene vinyl alcohol copolymers (EVOH) and acrylate resins. Among these, PVA is preferable, which is easily adsorbed on the fiber surface of PTFE and whose impregnation can be carried out homogeneously.

The hydrophilizing treatment can be carried out specifically by the following procedure. First, the porous membrane laminate is dipped in isopropyl alcohol (IPA) for 0.25 min or more and 2 min or less, and thereafter, dipped in a PVA aqueous solution of 0.5% by mass or more and 0.8% by mass or less for 5 min or more and 10 min or less. Thereafter, the porous membrane laminate is dipped in pure water for 2 min or more and 5 min or less, and thereafter crosslinked by addition of a crosslinking agent or irradiation with electron beams. After the crosslinking, the porous membrane laminate is washed with pure water, and dried at room temperature (25° C.) or more and 80° C. or less, whereby the surface of the porous membrane laminate can be hydrophilized. As the crosslinking agent, there can be used, for example, an agent forming glutaraldehyde crosslinking, terephthalaldehyde crosslinking or the like. As the electron beams, for example, those of 6 MRad can be used.

According to the porous membrane laminate, having one thereof or a plurality thereof makes the accuracy of the filtration treatment excellent. Therefore, the porous membrane laminate is suitable as a microfiltration filter for dispersion medium and gasses used in applications to cleaning, peeling, chemical liquid feeding and the like in semiconductor-related fields, liquid crystal-related fields and food and medical treatment fields.

OTHER EMBODIMENTS

It should be understood that the embodiment disclosed herein is illustrative in every respect and not restrictive. The scope of the present invention is defined not by the above-mentioned embodiment but by the terms of the claims and is intended to include any modifications within the meaning and the range equivalent to the terms of the claims.

Examples

Hereinafter, the present invention will be described in more detail by way of Examples, but the present invention is not any more limited to these Examples.

<Porous Membrane Laminates>

[Test No. 1]

An aqueous dispersion (dispersion medium: water, solid content concentration: about 55% by mass) of a fine powder of a copolymer (FEP-modified PTFE (having absorption of HFP in an IR spectrum, second heat of fusion: 28.6 J/g, molecular weight: about 4,000,000) of hexafluoropropylene and tetrafluoroethylene being raw material powders was prepared.

Then, an aluminum foil of 50 μm in thickness was laid out and fixed without wrinkles on a glass flat plate; the dispersion prepared in the above was dropped; thereafter, the dispersion of the modified PTFE was spread so as to become uniform all over the aluminum foil by slidingly moving a stainless steel slide shaft (Stainless Fine Shaft SNSF type, outer diameter: 20 mm), manufactured by Nippon Bearing Co. Ltd. The foil was subjected to steps of drying at 80° C. for 60 min, heating at 250° C. for 1 hour and heating at 340° C. for 1 hour, and thereafter naturally cooled to thereby form an FEP-modified PTFE thin membrane (FEP-modified PTFE non-porous membrane) fixed on the aluminum foil. Since in the presence of high-concentration oxygen such as the air, the FEP-modified PTFE due to heating is thermally decomposed and makes unevenness to raise the surface roughness, in order to suppress the action, the heatings were carried out in an inert gas atmosphere (nitrogen gas). Then, the aluminum foil was dissolved and removed in hydrochloric acid to thereby obtain an FEP-modified PTFE thin membrane (FEP-modified PTFE non-porous membrane).

Then, the membrane was stretched to a stretch ratio of 3 times by a specially manufactured transverse stretching machine with an inlet chuck width of 230 mm, an outlet of 690 mm, a stretch zone length of 1 m, a line speed of 6 m/min and at 25° C. Then, the membrane was stretched to a stretch ratio of 3 times by a specially manufactured transverse stretching machine with an inlet chuck width of 300 mm, an outlet of 750 mm, a stretch zone length of 1 m, a line speed of 6 m/min and at 140° C. By this stretching, a porous membrane of Test No. 1 of 0.001 mm in average thickness was obtained.

Then, by using a PTFE fine powder A (second heat of fusion: 26.0 J/g, molecular weight: about 5,000,000) as a raw material powder, a PTFE sheet was fabricated by the following procedure and used as a support membrane. First, the PTFE fine powder and the solvent naphtha ("Super Sol FP-25", manufactured by Idemitsu Petroleum Co. Ltd.) as a liquid lubricant were mixed in a proportion of 23 parts by mass of the solvent naphtha to 100 parts by mass of the powder. Then, the mixture was put in a molding machine and compression molded to thereby obtain a block-shaped molded material. Then, the block-shaped molded material was extruded continuously into a sheet shape, thereafter passed through a rolling roller, and in order to remove the liquid lubricant, further passed through a heating roll (130° C. to 220° C.), and taken up on a roll to thereby form a PTFE sheet of 320 μm in average thickness. Then, the sheet was stretched at a roll temperature of 250° C. to 280° C. to a stretch ratio of 3.5 times in the longitudinal direction (machine direction). Then, both ends in the width direction of the sheet after the longitudinal stretching were grasped with chucks, and the sheet was stretched in an atmosphere of 150° C. in the transverse direction orthogonal to the machine direction, to a stretch ratio of 23 times. The sheet was held as it was at 285° C. for 0.25 min to 1 min to be heat set. The sheet thus stretched was passed through a heating furnace at 360° C. to be sintered for 1.5 min. Thereby, a support membrane was obtained in which the average thickness was 0.008 mm; the average flow pore size was 235 nm; the average bubble point was 194 kPa; the Gurlay's number was 13 s; and the polystyrene particle capturing ratio was 0%.

Then, a porous membrane laminate of Test No. 1 was fabricated that has a three-layer structure, shown in FIG. 1, having two layers of the support membrane and one layer of the porous membrane disposed between the pair of the support membranes. In a step of laminating the support membranes on the porous membrane of Test No. 1, the support membranes were laminated on both surfaces of the porous membrane of Test No. 1, and thereafter heated at 370° C. for 100 s to thermally fusion bond the layers at boundaries thereof to unify the layers. Thereby, a porous membrane laminate of Test No. 1 of 0.019 mm in average thickness was obtained. Here, with regard to the average thickness of the porous membrane laminates of Test No. 1 to Test No. 7, membrane thicknesses of three points of a porous membrane laminate were measured by using a standard type digital thickness gauge, and an average value thereof was calculated for the porous membrane laminate.

[Test No. 2]

As a raw material powder, a PTFE fine powder B (second heat of fusion: 15.8 J/g, molecular weight: about 28,000,000) was used. The PTFE fine powder B used here was a powder obtained by drying an emulsion polymerized product composed of PTFE particles (primary particles) formed by emulsion polymerization of tetrafluoroethylene, and granulating the resultant. The PTFE fine powder B and the solvent naphtha as a liquid lubricant were mixed in a proportion of 12 parts by mass of the solvent naphtha to 100 parts by mass of the powder. Then, the mixture was put in a molding machine and compression molded to thereby obtain a block-shaped molded material. Then, the block-shaped molded material was extruded continuously into a sheet shape, thereafter passed through a rolling roller, and in order to remove the liquid lubricant, further passed through a heating roll (130° C. to 220° C.), and taken up on a roll to thereby form a PTFE sheet of 320 μm in average thickness. Then, the sheet was stretched at a roll temperature of 250° C. to 280° C. to a stretch ratio of 4 times in the longitudinal direction (machine direction). Then, both ends in the width direction of the sheet after the longitudinal stretching were grasped with chucks, and the sheet was stretched in an atmosphere of 150° C. in the transverse direction orthogonal to the machine direction, to a stretch ratio of 27 times. The sheet was held as it was at 285° C. for 0.25 min to 1 min to be heat set. By this stretching, a porous membrane of Test No. 2 of 0.021 mm in average thickness was obtained.

The sheet thus stretched was passed through a heating furnace at 360° C. to be sintered for 1.5 min to thereby obtain a porous membrane of Test No. 2. Then, by the same step as for the porous membrane laminate of Test No. 1, a porous membrane laminate of Test No. 2 of 0.021 mm in average thickness was obtained.

[Test No. 3 and Test No. 4]

A porous membrane laminate of Test No. 3 of 0.036 mm in average thickness and a porous membrane laminate of Test No. 4 of 0.028 mm in average thickness were obtained by the same step as for the porous membrane laminate of Test No. 2, except for setting the longitudinal stretching at a stretch ratio of 8 times and the transverse stretching at a stretch ratio of 25 times.

[Test No. 5]

A porous membrane laminate of Test No. 5 of 0.036 mm in average thickness was obtained by the same step as for the porous membrane laminate of Test No. 2, except for mixing the PTFE fine powder B and the solvent naphtha as a liquid lubricant in a proportion of 18 parts by mass of the solvent naphtha to 100 parts by mass of the powder, and setting the longitudinal stretching at a stretch ratio of 2 times and the transverse stretching at a stretch ratio of 27 times.

[Test No. 6]

A porous membrane laminate of Test No. 6 of 0.052 mm in average thickness was obtained by the same step as for the porous membrane laminate of Test No. 2, except for using a PTFE fine powder C (second heat of fusion: 17.0 J/g, molecular weight: about 23,000,000) as a raw material powder, mixing the PTFE fine powder C and the solvent naphtha as a liquid lubricant in a proportion of 14 parts by mass of the solvent naphtha to 100 parts by mass of the powder, and setting the longitudinal stretching at a stretch ratio of 5 times and the transverse stretching at a stretch ratio of 20 times.

[Test No. 7]

A porous membrane laminate of Test No. 7 of 0.024 mm in average thickness was obtained by the same step as for the porous membrane laminate of Test No. 6, except for setting the longitudinal stretching at a stretch ratio of 4 times and the transverse stretching at a stretch ratio of 22 times.

<Evaluation>

[Average Flow Pore Size]

The average flow pore sizes K of the porous membrane laminates of Test No. 1 to Test No. 7 were calculated by the following procedure. First, for the porous membranes and the porous membrane laminates of Test No. 1 to Test No. 7, pore size distributions were measured according to ASTM F316-03, JIS-K3832 (1990) by a pore size distribution analyzer (Perm Porometer "CFP-1500A", manufactured by Porous Materials, Inc.) and by using, as a test liquid, propylene, 1,1,2,3,3,3-oxidized hexahydrofluoric acid having a surface tension of 15.9 dyn/cm ("GALWICK", manufactured by Porous Materials, Inc.). Then, the average flow pore sizes [nm] were determined from the pore size distributions.

[Average Fiber Length of the Porous Membrane]

The average fiber lengths [nm] of the porous membranes of Test No. 1 to Test No. 7 were measured by the above method.

[Gurlay's Number]

The Gurlay's number [s] of the porous membrane laminates of Test No. 1 to Test No. 7 were measured by the above method.

[Capturing Ratio of Polystyrene Particles]

The capturing ratios [%] of polystyrene particles of the porous membrane laminates of Test No. 1 to Test No. 7 were each measured by making a 0.1%-octoxynol ("Triton X-100", manufactured by Dow Chemical Co.) aqueous solution containing polystyrene particles G40 (nominal size: 0.04 μm), manufactured by Thermo Fisher Scientific Inc., of a concentration of 12 ppb, to pass through the porous membrane laminate, and collecting a filtrate after the passing-through of 500 ml. Then, the concentration of the polystyrene particles in the filtrate was calculated from the fluorescent luminous intensity of the filtrate of the polystyrene particles measured by a spectrofluorometer ("Spectrofluorometer RF-6000", manufactured by Shimadzu Corp.). Then, the particle retention rate was calculated from the following expression:

$$\text{Particle retention rate [\%]} = \{([\text{a concentration of polystyrene particles in a fed liquid}] - [\text{a concentration of polystyrene particles in a filtrate}])/[\text{the concentration of polystyrene particles in the fed liquid}]\} \times 100$$

[The Average Bubble Point of the Porous Membrane Laminate and the Surface Roughness of the Porous Membrane]

The average bubble points of the porous membrane laminates of Test No. 1 to Test No. 7 and the surface roughnesses of the porous membranes thereof were measured by the above methods.

Figure 2:
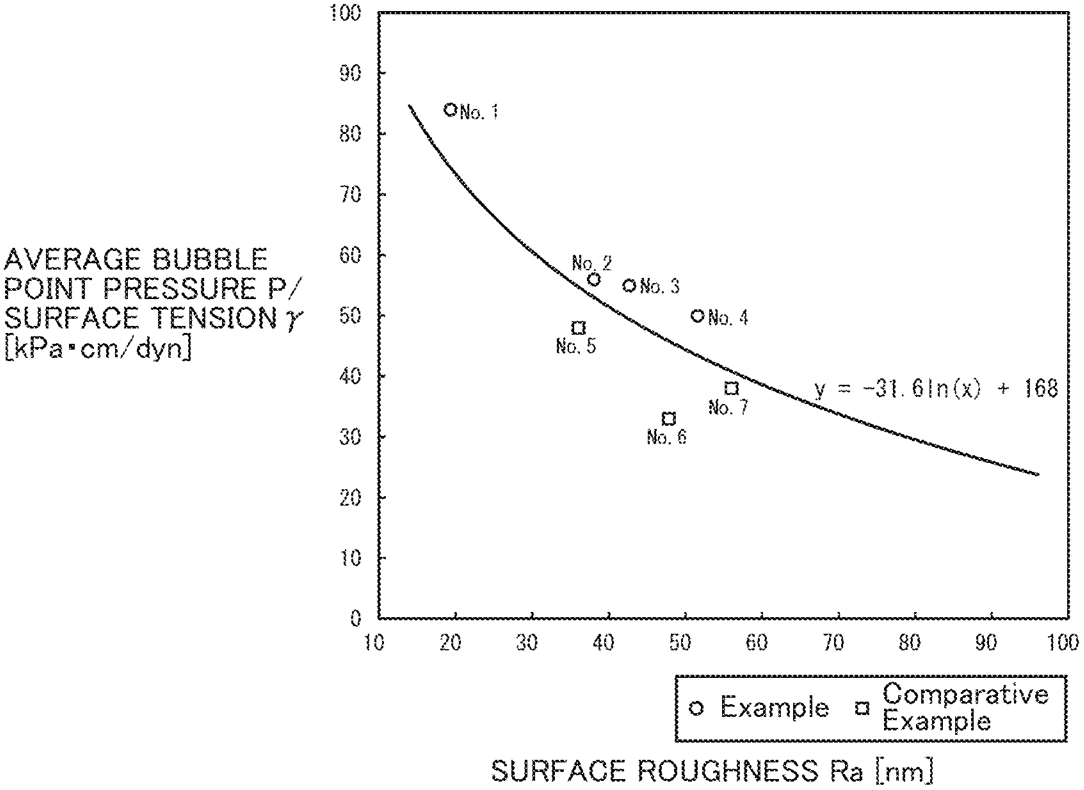
FIG. 2 is a graph showing a relation between the surface roughness of a porous membrane laminate and the ratio of the average bubble point to the surface tension of a test liquid.
Figure 3:
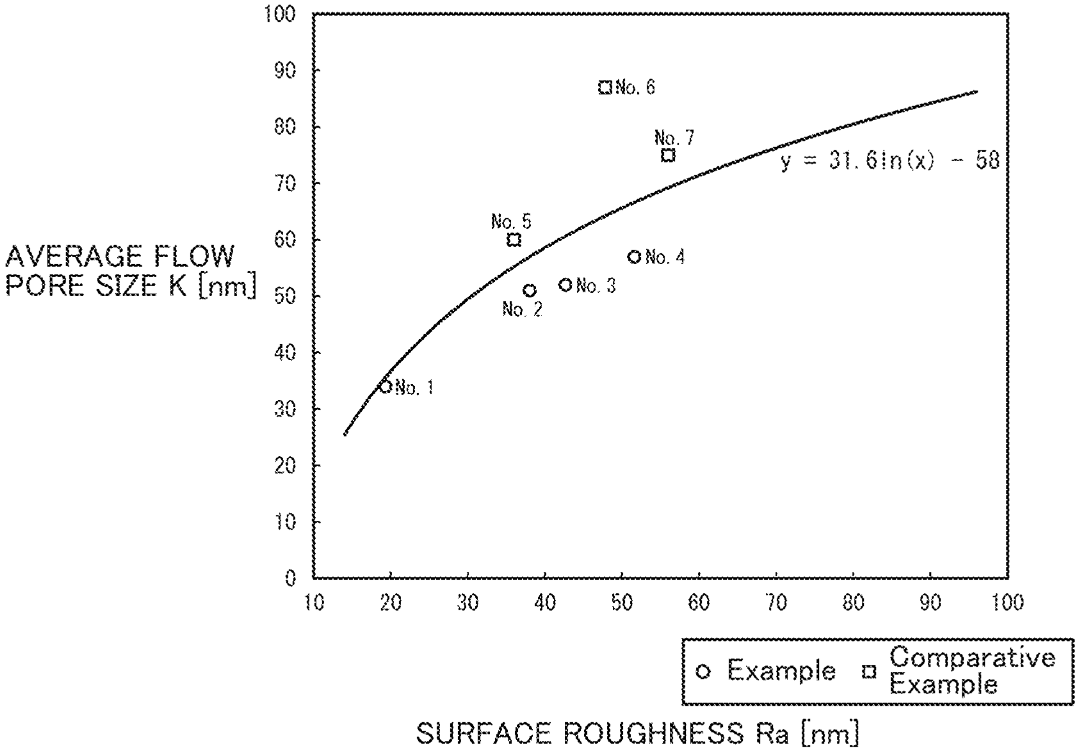
FIG. 3 is a graph showing a relation between the surface roughness of a porous membrane laminate and the average flow pore size of the porous membrane laminate.

Shown in Table 1 are the evaluation results of the average flow pore sizes of the porous membrane laminates of Test No. 1 to Test No. 7, and the average fiber lengths, the Gurlay's numbers and the polystyrene capturing ratios of the porous membranes thereof. Then, shown in FIG. 2 are relations between the surface roughnesses of the porous membrane laminates of Test No. 1 to Test No. 7 and the ratios of the average bubble points to the surface tension of the test liquid; and shown in FIG. 3 are relations between the surface roughnesses of the porous membrane laminates and the average flow pore sizes of the porous membrane laminates.

| Test No. | Porous membrane laminate: Average thickness [mm]: Porous membrane laminate [mm] | Average thickness [mm]: Porous membrane laminate [mm] | Average bubble point [kPa] | Surface roughness of porous membrane Ra [nm] | Right-hand side of formula (1) −31.6 × InRa + 168 | Average bubble point/Surface tension of test liquid P/γ [kPa · cm/dyn] | Right-hand side of formula (2) 31.6 × InRa − 58 | Average flow pore size K [nm] | Average fiber length of porous membrane [nm] | Evaluation: Gurlay's number [s] | Evaluation: Polystyrene particle capturing ratio [%] |
|---|---|---|---|---|---|---|---|---|---|---|---|
| 1 | 0.019 | 0.001 | 1330 | 19 | 74.4 | 84 | 35.6 | 34 | 298 | 58 | 43 |
| 2 | 0.021 | 0.010 | 892 | 38 | 53.0 | 56 | 57.0 | 51 | 959 | 35 | 35 |
| 3 | 0.036 | 0.007 | 875 | 43 | 49.4 | 55 | 60.6 | 52 | 986 | 41 | 26 |
| 4 | 0.028 | 0.009 | 800 | 52 | 43.4 | 50 | 66.6 | 57 | 1089 | 24 | 22 |
| 5 | 0.036 | 0.013 | 524 | 48 | 45.8 | 33 | 64.2 | 87 | 1037 | 25 | 4 |
| 6 | 0.052 | 0.012 | 762 | 36 | 54.8 | 48 | 55.2 | 60 | 876 | 40 | 10 |
| 7 | 0.024 | 0.010 | 604 | 56 | 40.8 | 38 | 69.2 | 75 | 977 | 38 | 8 |

As shown in Table 1, the porous membrane laminates of Test No. 1 to Test No. 4 in which the relation between the surface roughness of the porous membrane laminate and the ratio of the average bubble point to the surface tension of the test liquid satisfied the above formula (1) were good in the polystyrene particle capturing ratio. On the other hand, the porous membrane laminates of Test No. 5 to Test No. 7 in which the relation between the surface roughness of the porous membrane laminate and the ratio of the average bubble point to the surface tension of the test liquid did not satisfy the above formula (1) were low in the value of the polystyrene particle capturing ratio.

From the above results, it is clear that the porous membrane laminate was excellent in the capturing performance of microparticles. Therefore, the porous membrane laminate can be used suitably as a filter or the like requiring high-accuracy filtration treatment performance.

REFERENCE SIGNS LIST

1 Porous membrane; 2 Support membrane; 10 Porous membrane laminate.

The invention claimed is:

1. A porous membrane laminate comprising one or more porous membranes containing polytetrafluoroethylene as a main component, wherein the porous membrane laminate satisfies a following formula (1):

$$P/\gamma > 31.6 \times \ln Ra + 168 \quad (1)$$

wherein P is an average bubble point [kPa]; γ is a surface tension [dyn/cm] of a test liquid used in measurement of the average bubble point; and Ra is a surface roughness [nm] of the porous membrane, and 14 nm≤Ra≤96 nm.

2. The porous membrane laminate according to claim 1, wherein the porous membrane laminate satisfies a following formula (2):

$$K < 31.6 \times \ln Ra - 58 \quad (2)$$

wherein K is an average flow pore size [nm]; and Ra is as defined for the formula (1).

3. The porous membrane laminate according to claim 2, wherein the average flow pore size K is 58 nm or less, and the surface roughness Ra is 55 nm or less.

4. The porous membrane laminate according to claim 1, further comprising one or more porous support membranes containing polytetrafluoroethylene as a main component, wherein the support membrane is laminated on one or both surfaces of the porous membrane.

* * * * *